United States Patent [19]

Barnes

[11] 4,344,134

[45] Aug. 10, 1982

[54] PARTITIONABLE PARALLEL PROCESSOR

[75] Inventor: George H. Barnes, Wayne, Pa.

[73] Assignee: Burroughs Corporation, Detroit, Mich.

[21] Appl. No.: 164,097

[22] Filed: Jun. 30, 1980

[51] Int. Cl.³ .............................................. G06F 9/00
[52] U.S. Cl. ................................................ 364/200
[58] Field of Search ... 364/200 MS File, 900 MS File, 364/130, 131, 133

[56] References Cited

U.S. PATENT DOCUMENTS

| | | | |
|---|---|---|---|
| 3,343,135 | 9/1967 | Freiman et al. | 364/200 |
| 3,350,689 | 10/1967 | Underhill et al. | 364/200 |
| 3,363,234 | 1/1968 | Erickson et al. | 364/200 |
| 3,400,372 | 9/1968 | Beausoleil et al. | 364/200 |
| 3,401,380 | 9/1968 | Bell et al. | 364/200 |
| 3,530,438 | 9/1970 | Mellen et al. | 364/200 |
| 3,537,074 | 10/1970 | Stokes et al. | 364/200 |
| 3,648,256 | 3/1972 | Paise | 364/200 |
| 3,676,860 | 7/1972 | Coller | 364/200 |
| 3,676,861 | 7/1972 | Ruth | 364/200 |
| 3,699,529 | 10/1972 | Beyers et al. | 364/200 |
| 3,715,729 | 2/1973 | Merey | 364/200 |
| 3,886,524 | 5/1975 | Appelt | 364/200 |
| 3,947,823 | 3/1976 | Padegs | 364/200 |
| 4,051,551 | 9/1977 | Lawrie et al. | 364/200 |
| 4,101,960 | 7/1978 | Stokes et al. | 364/200 |

Primary Examiner—Gareth D. Shaw
Assistant Examiner—David Y. Eng
Attorney, Agent, or Firm—L. C. Brenner; M. L. Young; K. R. Peterson

[57] ABSTRACT

In a parallel processing array wherein each processor therein issues a ready signal to signify that it is ready to begin a parallel processing task and initiates the task upon receipt of an initiate signal the parallel processing array is rendered partitionable into parallel processing subarrays by a control node tree having a plurality of control nodes connected to the plurality of processors and in decreasing levels to each other in a tree-like fashion down to a single root node. Each node is controlled to function as a non-root wherein it receives a ready signal from its processor side and passes it along toward the single root node or as a root node whereupon receiving a ready signal it issues back an initiate signal toward the plurality of processors.

4 Claims, 5 Drawing Figures

| CONTROL LOGIC | | NODES SET TO "ROOT" | NODES SET TO "ROOT̄" |
|---|---|---|---|
| BINARY | DECIMAL | | |
| 0 0 0 | 0 | 1,7 | 2,3,4,5,6 |
| 0 0 1 | 1 | 1,2,7 | 3,4,5,6 |
| 0 1 0 | 2 | 1,2,3,7 | 4,5,6 |
| 0 1 1 | 3 | 5,7 | 1,2,3,4,6 |
| 1 0 0 | 4 | 5,3,7 | 1,2,4,6 |
| 1 0 1 | 5 | 5,3,4,7 | 1,2,6 |
| 1 1 0 | 6 | 5,6,7 | 1,2,3,4 |
| 1 1 1 | 7 | 7 | 1,2,3,4,5,6 |

PARTITIONABLE PARALLEL PROCESSOR

BACKGROUND AND OBJECTS OF THE INVENTION

This invention relates generally to large scale data processing systems and more particularly to systems employing a plurality of processors operating more or less simultaneously in order to reduce overall program execution time.

In the development of digital computers a most important design goal has always been to maximize their operating speed, i.e., the amount of data that can be processed in a unit of time. It has become increasingly apparent in recent times that two important limiting conditions exist within the present framework of computer design. These are the limits of component speed and of serial machine organization. To overstep these limitations two different types of parallel operating system have been developed.

First, multiprocessing systems have been developed wherein a number of quite independent processors have been linked together to operate in parallel on differing portions of a program or job in order to speed execution of that program or job. Frequently, the processors are linked together in a network loop or similar fashion, thus greatly showing the cooperation between processors. When the processors are linked together by a parallel and much faster network such as a crossbar network, the network control mechanism and the cost and reliability of the network quickly become unwieldly for a reasonable large number of processors.

Second, high speed parallel locked-step processing systems have been developed providing an array of processing elements under control of a single control unit.

As speed requirements of computation have continued to increase, systems employing greater numbers of parallel memory modules have been developed. One such system has in the order of 64 parallel memories, see U.S. Pat. No. 3,537,074, issued Oct. 27, 1970, to R. A. Stokes et al, and assigned to the assignee of the present invention. However, parallel processors have not been without their own problems.

Primarily, parallel processors are often so far removed from the conventional scalar processors that they are hard to program. Secondarily, parallel processors are fashioned to operate efficiently with vectorized data but are quite inefficient operating upon scalar data. Finally, parallel processors, being found operating in locked-step fashion in prior art force all processors in the parallel array thereof to perform in synchronization whether or not such operation is needed in all processors.

The manner of difficulty in programming the parallel array has been greatly eased by the incorporation and use of the computational envelope approach as disclosed in U.S. Pat. No. 4,101,960, issued July 18, 1978, in the name of Stokes et al, and assigned to the assignee of the present invention. Briefly, in the computational envelope approach a host or support processor of a general processing variety (such as a Burroughs B7800) functions as an I/O controller and user interface. Special purpose jobs are transferred in their entirety (program and data) to a large high speed secondary storage system or data base memory and from hence to the array memory modules and array processor for processing. During the special purpose processing period the front end support or host processor is freed for other processing jobs. Once the complete special purpose job or task is executed by the array processors, the resultants therefrom are returned through the array memories and the data base memory to the support processor for output to the user.

A parallel processing system employing the computational envelope approach and being capable of functioning in either a multiprocessing mode or a parallel processing mode is disclosed in U.S. patent application Ser. No. 097,191, filed Nov. 26, 1979, in the name of G. H. Barnes et al and assigned to the assignee of the present invention. The present invention functions in such a disclosed parallel system and enhances its parallel processing mode of operation by providing apparatus and method for partitioning the parallel system into a plurality of parallel subsystems, each subsystem therein functioning independently from all other subsystems.

It is an object of the present invention to provide a processing array functioning in the computational envelope mode of operation.

It is another object of the present invention to provide an array of processors which can function efficiently and effectively both in multiprocessing and parallel processing.

It is yet another object of the present invention to provide apparatus and method for partitioning a parallel processor system into a plurality of parallel processor or subsystem each capable of relatively independent function.

SUMMARY OF THE INVENTION

The above and other objects of the present invention are realized through a node control tree wherein a plurality of processors are connected to a lesser plurality of control nodes which are in turn connected to a still lesser plurality of control nodes and continuing thusly to a single root control node. Each processor issues the node tree an "I got here" signal to indicate that it is ready to begin a parallel processing instruction. When all processors feeding through to a root node are issuing an "I got here" signal and the root node issues back a "GO" signal to all such processors to initiate the parallel processing instruction. Control signals are provided to each node to instruct it to either function as a root node or to feed through all arriving "I got here" signals to the next lower level node. In such a manner the plurality of processors may be partitioned as desired in subsystems of parallel processors.

DESCRIPTION OF THE PREFERRED EMBODIMENT

Figure 1:
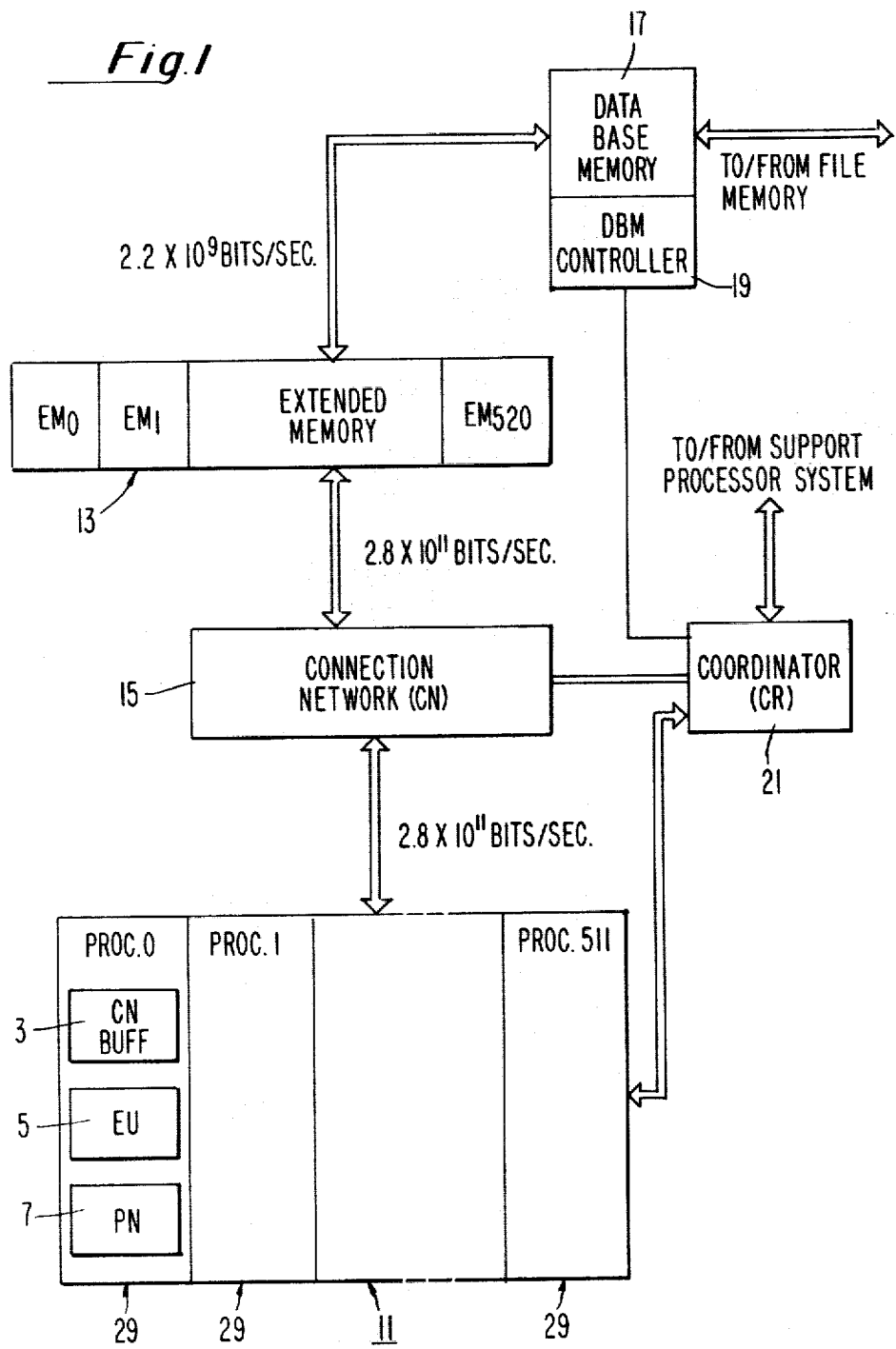
FIG. 1 is a block diagram showing the environmental architecture in which the present invention functions.

The preferred parallel processing environment for the present invention, see FIG. 1, comprises five major component elements; namely, the processor array 11, the extended memory module array 13, the connection network 15 interconnecting the processor array 11 with the extended memory module array 13, the data base memory 17 with data base memory controller 19 for staging jobs to be scheduled and for high-speed input-/output buffering of jobs in execution, and the coordinator 21 used to synchronize the processor array 11 and coordinate data flow through the connection network 15.

In operation, all data and program for a run is first loaded into the data base memory 17 prior to the beginning of the run. This loading is initiated by a Support Processor System (not shown) which functions as a user and input/output interface to transfer under control of a user data and programs from a secondary storage file memory (not shown). The use of such a Support Processor System is detailed in the above-cited U.S. Pat. Nos. 3,537,074 and 4,101,960.

As the run is initiated, the data base memory controller 19 transfers code files from the data base memory 17 to the extended memory module array 13. Then the data base memory controller 19 transfers the processor array 11 code files thereto and the necessary job data to the extended memory module array 13.

Once initated the present invention is capable of parallel execution in a manner similar to the lock-step array machines disclosed in U.S. Pat. Nos. 3,537,074 and 4,101,960. Simple programs (having a copy thereof resident in each processor of the processor array 11), with no data-dependent branching, can be so executed. However, the present invention is not limited to parallel mode operation since it can also function in the manner of a conventional multiprocessor. Thus, as will be detailed hereinafter, the present invention performs essentially just as efficiently whether the data is arranged in the form of vectors or not. The processor array 11 can function in the lock-step fashion for vector processing and in independent scalar fashion for multiprocessing operation.

A simple but illustrative example of the operation of the present invention involves the following vector calcuation:

1. A+B=C
2. If C greater than 0 do subroutine W to calculate Z
3. If C equals 0 do subroutine X to calculate Z
4. If C less than 0 do subroutine Y to calculate Z
5. Calculate D=A divided by Z With vector notation it is appreciated that A represents the elements $a_i$ from $a_1$ to $a_n$ wherein n equals the number of elements in the vector. The same relationship holds for vectors B, C, D and Z. Also it is appreciated that the elements of vectors are individually stored in memory modules of the extended memory module array 13 and that the elements are fetched therefrom and operated thereupon individually by the individual processors of the processor array 11.

The elements of the vectors are loaded into the memory modules according to some particular mapping scheme. The simplest loading scheme would be to load the first vector element into the first memory module, the second vector element into the second memory module, etc. However, such a simple mapping does not lead to efficient parallel processing for many vector operations. Hence, more complex mapping schemes have been developed such as disclosed in U.S. Pat. No. 4,051,551, entitled "Multidimensional Parallel Access Computer Memory System", issued Sept. 27, 1977 in the names of Lawrie et al and assigned to the assignee of the present invention. The mapping scheme disclosed therein is incorporated in the "Scientific Processor" of U.S. Pat. No. 4,101,960, issued July 18, 1978, in the name of Stokes et al and assigned to the assignee of the present invention.

The actual mapping scheme selected is relatively unimportant to the basic operation of the present invention. It is important however, that the rule of the mapping scheme be stored in processor array 11 so that each processor therein can calculate by that rule where the vector element is stored that must be fetched. For example, if the first processor is always to fetch from the first memory module 13, and the second processor 11 from the second memory module 13, etc. the instruction stored in each processor would express "fetch element specified from memory i" where "i" would be the processor 29 number. As will be detailed later, each processor 29 has wired in, preferably in binary format, its own processor number and each memory module likewise. It will also be appreciated that each stored element is identified as being stored in a particular memory module 13 at a particular storage location therein. The exact storage location is a direct function of the mapping used to store the element. This mapping is known and stored as a subroutine in each processor 11 to determine from whence it is to fetch its particular element.

As will also be detailed later, the connection network 15 can be set to "broadcast" to all processors 11 simultaneously. Thus in one transferance it can store a copy of mapping subroutines and other program instructions in each processor 29.

Following loading of the program instructions the execution of the problem or job to be solved begins. In the example above, each processor 29 fetches its element $a_i$ of vector A and its element $b_i$ of vector B to calculate by addition its element $c_i$ of vector C. Since the processors are all doing the same thing, the above fetching and calculating occurs early in parallel.

However, each processor is now storing a value $c_i$ which is either greater than, equal to, or less than zero. It performs the appropriate subroutine to calculate its element $z_i$ of Z. Thus in sharp contrast to prior art locked-step processors, the processors 29 of the present invention are not all proceeding on the same branch instruction simultaneously.

Assuming now that the entire vector Z must be determined before the next step can be executed each processor calculating a vector element $z_i$ issued a flat indicating "I got here" or that it has successfully completed its last instruction, that of calculating $z_i$. That processor 29 is halted. The Coordinator 21 monitors all processors 29 that are calculating a vector element $z_i$. When all such processors 29 issue their "I got here" flag, the Coordinator 21 issues a "GO" instruction and all processors 29 then begin the next instruction (in the present example, that of calculating vector element $d_i$ of D). Thus, the processors 29 can function independently and effectively but still be locked in parallel by a single instruction when such parallel operation is called for.

Following calculation of the elements $d_i$ of the vector D, the vector D is fed back through the connection network 15 to the extended memory module 13 and from hence through the data base memory 17 to the user.

The above simplified illustrative example of the operation of the present invention presented an overview of the structure and function of the present invention. A fuller understanding may be derived from a closer examination of its component parts.

The processor array 11 consists of 512 independent like processors 29 denoted as Processor 0 through Processor 512 in FIG. 1. Each processor 29 includes a connection network buffer 23, an execution unit 25 and a local processor memory 27. The number of processors 29 in the processor array 11 is selected in view of the power of each processor 29 and the complexity of the overall tasks being executed by the processor array 11. Alternate embodiments may be fabricated employing more or less than 512 processors 29 having less or more processing capability than detailed below.

In the array of 512 processors 29 (516 counting spares) each processor is identical to all others except for an internal identifying number which is hardwired into each processor (by 10 lines representing in binary code the number of the processor) in the preferred embodiment but may be entered by firmware or software in alternate embodiments. It is of importance only that when data is to flow to or from processor number 014 (for example) that a single processor 29 is identified as being number 014.

Figure 2:
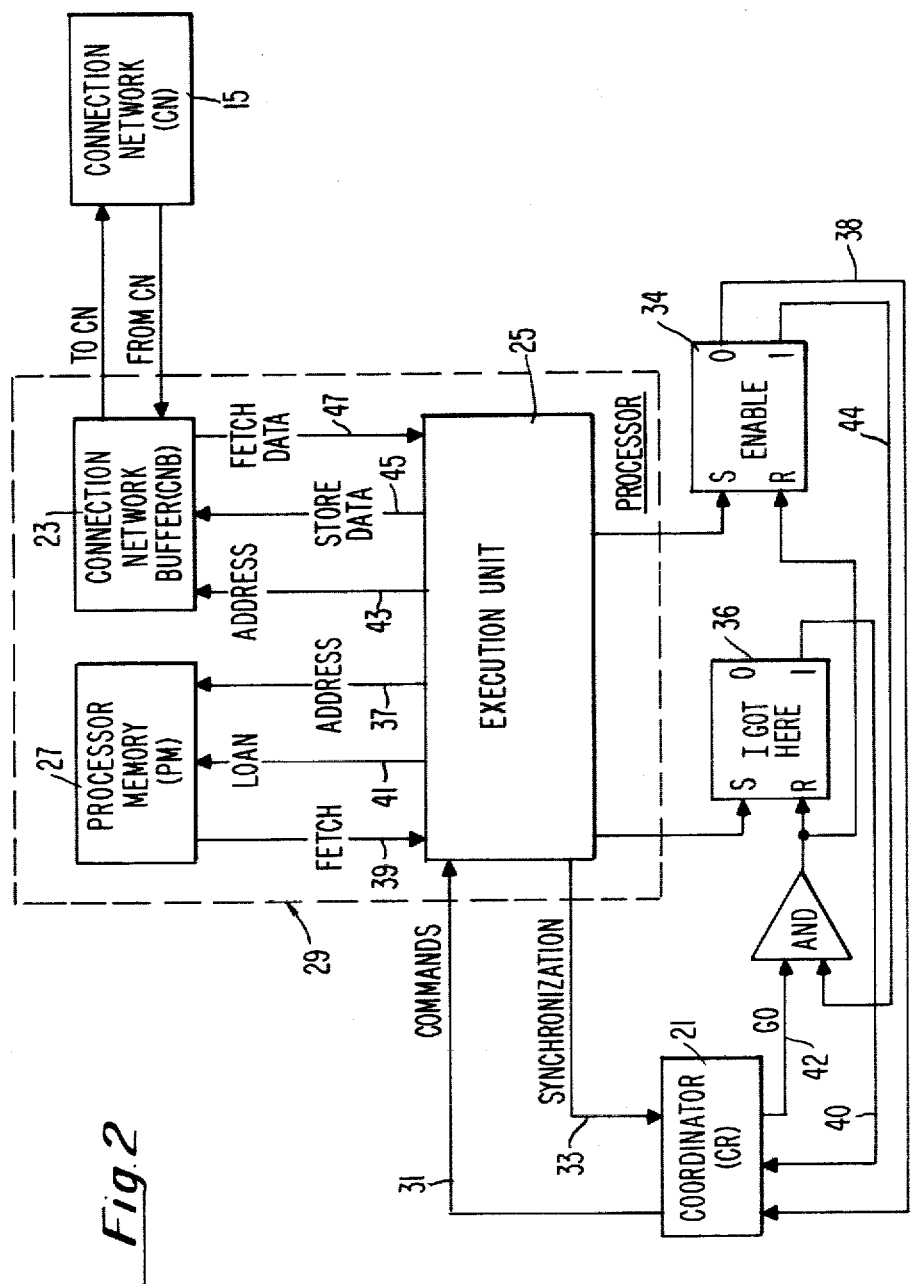
FIG. 2 is a diagram of the major component parts of a processor used in the processing array of FIG. 1.

Each processor 29 is in itself a conventional FORTRAN processor functioning to execute interger and floating-point operations on data variables. Each processor 29, see FIG. 2, is partitioned into three parts; namely, the Execution Unit 25, the Processor Memory 27, and the Connection Network Buffer 23.

The Execution Unit 25 is the logic part of the Processor 29. The Execution Unit 25 executes code contained in its Processor Memory 27, fetches and stores data through the Connection Network 15 via its Connection Network Buffer 23. As will be detailed hereinafter, the Execution Unit 25 also accepts commands from the Coordinator 21 via the Command Line 31 and synchronization via the Synchronization Line 33. The Execution Unit 25 executes instructions stored in its Processor Memory 27 by addressing same through Address Path 37 to fetch instruction code on Fetch Line Path 39 or to store instruction code on Store Path 41. Likewise, data is transferred through the connection network 15 via the connection network buffer 23 through the Address Path 41, the store data path 45, and the fetch data path 47.

Associated with the execution unit 25 is an enable flip-flop 34 and a I-got-here flip-flop 36. A flag bit programmed into the code executed by the execution unit 25 indicates when the execution unit 25 is executing an instruction or task which must be concluded by itself and all other like execution units 25 working on the same data before all execution units 25 proceed with further instructions. This flag bit sets enable flip-flop 34 thereby raising the enable output line 36 thereof and deactivating the not-enable line 38 thereof which is fed to the coordinator 21 to indicate which processors 29 are not-enabled. When the instruction or task is completed by the execution unit 25 (i.e., the calculation by "Z" in the example above), a bit is sent out to set the "I-got-here" flip-flop 36 which raises its I-got-here output line 40 to the coordinator 21. The coordinator 21 thereup issues a command via its command and synchronization lines 31 and 33 to halt the processor 29 until the coordinator 21 receives an I-got-here signal from all enabled processors 29. Then a "GO" signal is issued from the coordinator 21 through line 42 and AND gate 44 to reset the I-got-here flip-flop 36 and the enable flip-flop 34 and the coordinator 21 also releases its halt commands through lines 31 and 33 and all processors 29 begin in parallel the execution of the next task or instruction which usually involves the fetching of freshly created or modified data from the extended memory array 13 through the connection network 15.

The Processor Memory 27 holds instructions for execution by the Execution Unit 25 and the data to be fetched in response to the data held. Preferably, the Processor Memory 27 is sufficient for storage of over 32,000 words of 48 bits plus error code each. Data, address and control communications is solely with the Execution Unit 25.

The Connection Network Buffer 23 functions as a asynchronous interface with the Connection Network 15 to decouple the Processor 29 from the access delays of the Connection Network 15 and the extended Memory Module Array 13 (FIG. 1). The Connection Network Buffers 23 communicates basically three items; the number of a particular Memory Module in the Extended Memory Module Array 13 with which communication is desired plus the operation code (i.e., fetch, store, etc.), the address within the particular Memory Module, and one word of data. The presence of an Extended Memory Module number in the Connection Network Buffer 23 functions as a request for that Extended Memory Module. An "acknowledge" signal is returned via the Connection Network 15 from the Extended Memory Module selected to indicate the success of the request.

Each and every Connection Network Buffer 23 is clock-synchronized with the Connection Network 15 to eliminate time races therethrough.

Figure 3:
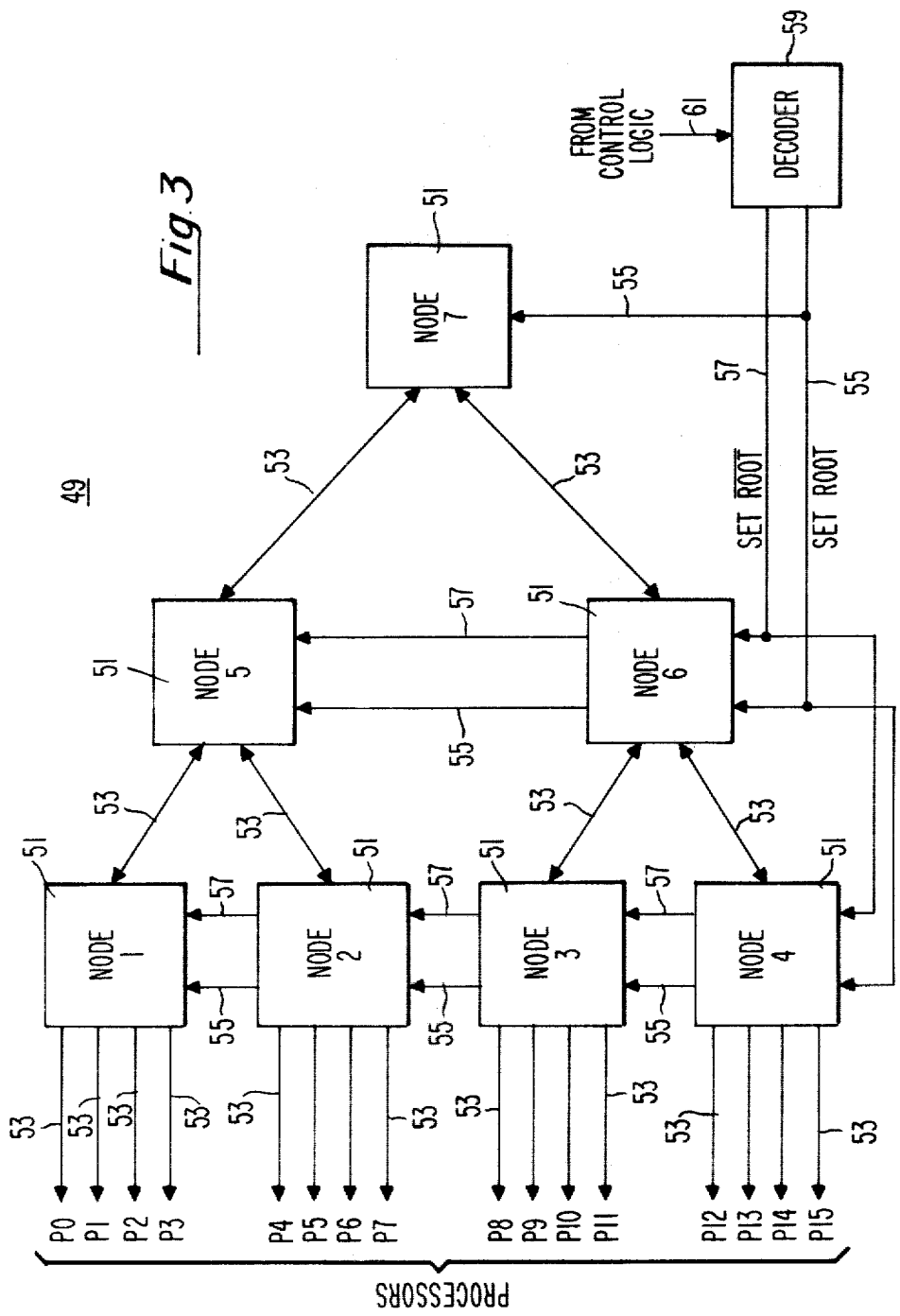
FIG. 3 is a diagram of arrangement of nodes utilized in the present invention to partition the architecture of FIG. 1 into subsystems of parallel processors.

In the present invention the partitioning of the processor array 11 into a plurality of relatively independently operating parallel processors 29 is achieved through a control node tree 49, see FIG. 3, which may be considered part of the Coordinator 21 of FIG. 1. In FIG. 3 the control node tree 49 extends from a circuit node 51 identified as root node 7 through six other node circuits 51 identified as nodes 1-6 to 16 processors 29 identified as processors P0-P15. Obviously, the control node tree 49 may be matured to handle a greater plurality of processors 29 or pruned to handle a lesser number as desired.

A bidirection data communication path 53 provides for the flow of data to and from each node circuit 51. The data flowing to the node circuits 51 connected to the processors 29 is the signal "I got here". When all the data communications paths 53 flowing to a node circuit 51 signal "I got here" that node circuit 51 issues an output signal on its data communications path 53 to the next node circuit 51 located nearer root node 7 signifying an "I got here" signal on all of its data communication paths 53, it issues back a "GO" signal. The "GO" signal flows through the data communications paths 53 and the node circuits 51 to the processors P0-P16.

Each processor P0-P16 receiving a "GO" signal begins its next instruction thereby initiating a parallel execution by a plurality of processors 29. Root node 7 always functions as a root. The function of a root is to issue back a "GO" signal when all of its data communication paths are carrying an "I got here" signal. Each node circuit 51 can function as a root or as a not-root.

The function of a not-root is to issue forward an "I got here" signal when all of its data communications paths 53 are carrying an "I got here" signal. Each node circuit 51 may be set to function as a root by a signal on its set root control line 55. Likewise, each node circuit 51 may be set to function as a non-root by a signal on its mutually exclusive non-root control line 57. Signals of the non-root lines 57 and the root line 55 may be generated as desired by a decoder 59 inputted by a three bit control signal inputted on line 61. Thus, see FIG. 3, the plurality of processors 29 may be partitioned into a number of parallel array processors 29 in accord with the function of the decoder 61 as tabulated in FIG. 4. It may be appreciated that such a decoder 59 may be fashioned from a PROM or other standard decoding hardware.

Figures 4, 5:
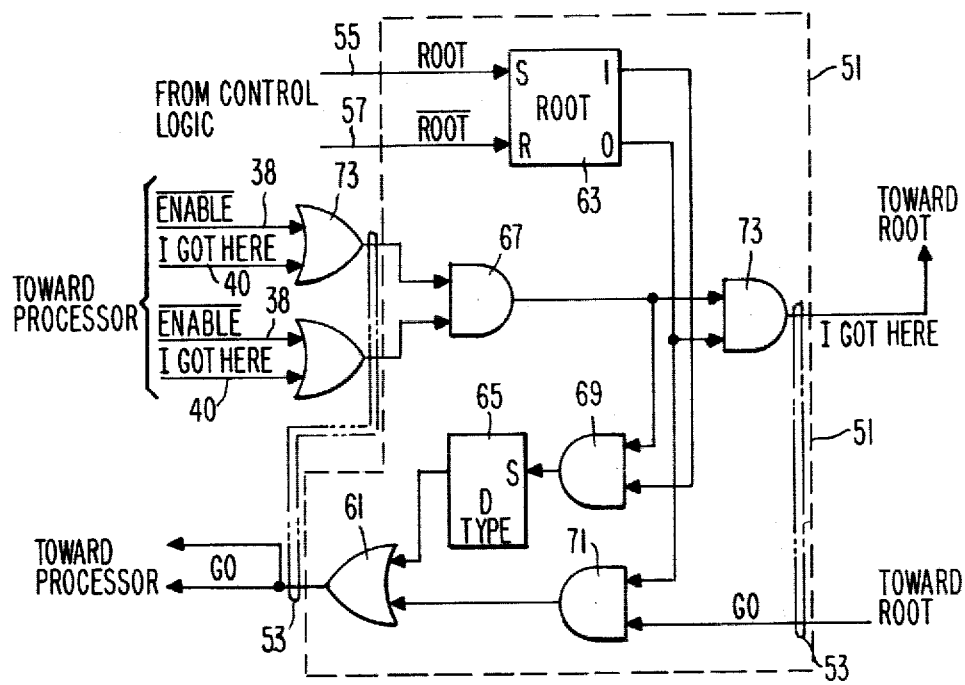
FIG. 4 illustrates in tabular format the control signals for various subsystem partitioning by the node arrangement of FIG. 3.
FIG. 5 is a logic diagram of each of the nodes of FIG. 3.

In the preferred embodiment, see FIG. 5, each node circuit 51 includes an OR circuit 61, the first flip-flop 63, a second flip-flop 65, and four AND gates 67, 69, 71 and 73. Two OR gates are utilized to connect the node circuit 51 to processors 29. These are OR circuit 75 and OR circuit 77. The exact physical location of OR circuit 75 and OR circuit 77 is immaterial to the invention and they may be found located directly at each processor 29, or they may be found located at or within the node circuit 51 that connects to the processors 29. The OR circuits 75 and 77 combine signals which say in essence that the processor 29 associated therewith is enabled and is sending its "I got here" signal. Although only two OR circuits 75 and 77 are shown in FIG. 5, it is realized that the actual number of OR circuits that would be utilized in a given system application would depend upon the number of processors 29 feeding the node circuit 51. For example, as shown in FIG. 3, four processors feed the circuit node 51 identified as node 1. Obviously, this plurality may be expanded or contracted as desired for partitioning purposes. The OR circuits 75 and 77 provide inputs to an AND circuit 67. If the node circuit 51 is functioning as a non-root then a signal on its root line 57 will set the root flip-flop 63 to reset and thus provide an input to AND circuit 67. A second input to AND circuit 67 is provided by the output of AND circuit 67 so that when the processors feeding the OR circuits 75 and 77 are either not enabled or are issuing their "I got here" signal then this signal signifying that "I got here" is fed through the AND circuit 67 and outputted toward the root node 7 of the node tree 49 on data communications path 53. Further, as can be seen from FIG. 5, when the node circuit 51 is functioning as a non-root, a "GO" signal issuing from the root node 7 on data communications path 53 is sent to and through AND circuit 71 and OR circuit 61 to provide an output signifying "GO" on data communications path 53 leading toward the processor 29.

When the node circuit 51 is functioning as a root node as indicated by a positive signal on its root line 55, the root flip-flop 63 is set to provide a signal into AND circuit 69 which is further fed by the input of AND circuit 67 so that the "I got here" signals coming from the processors 29 are fed therethrough to set a D type flip-flop 65. The D type of flip-flop 65 provides a momentary delay so as to avoid any race type problems that may occur. The output of the D type flip-flop 65 inputs OR circuit 61 and generates out therefrom on data communications line 53 a signal indicating the code "GO". Thus, the plurality of processors 29 shown in FIG. 1 and FIG. 3 may be set to function as subsets of parallel processors 29 of such size and configurations as may be desired.

The signal described in the above-description of the preferred embodiment of the invention as "I got here" signifying that a processor is ready to begin a parallel processing task will be referred to in the appended claims as a ready signal and like the signal above-identified as "GO" signalling to the processor to initiate its parallel task will be referred to in the appended claims as an initiate signal.

Thus, while the present invention has been described with a certain degree of particularity, it should be understood that the present disclosure has been made by way of example and that changes in the combination and arrangement of parts obvious to one skilled in the art, may be resorted to without departing from the scope and spirit of the invention. Although the present invention has been described with reference to its preferred embodiment, it is understood by those skilled in the art that many modifications, variations, and additions may be made to the description thereof.

What is claimed is:

1. A partitionable parallel processor control network for a plurality of parallel processors wherein each processor therein emits a ready signal when it is ready to execute a parallel processing task and initiates said parallel processing task upon receipt of an initiate signal, said partitionable parallel processor control network comprising:

a single root control node means having a plurality of processor side data lines for receiving on each a ready signal and sending back on each an initiate signal when each processor side data line in said plurality thereof is receiving a ready signal;

a control node tree having a plurality of bi-mode control node means, each bi-mode control node means therein having a plurality of processor side data lines, a single root control node means side data line, and a control input for designating a non-root operating mode wherein a ready signal is outputted on said signal root control node means side data line when a ready signal is being received on each processor side data line in said plurality thereof, and for designating a root operating mode wherein an initiate signal is outputted back on each processor side data line in said plurality thereof when a ready signal is being received on each processor side data line in said plurality thereof, said control node tree being configured with a first level and a lesser level of pluralities of bi-mode control node means, each said first level bi-mode control node means therein having each processor side data line in its said plurality thereof connected to an individual processor in said plurality thereof for receiving therefrom a ready signal and for sending thereto an initiate signals, said first level plurality and lesser level pluralities of bi-mode control node means being coupled in a tree-like fashion to a last level bi-mode control node means therein having each said root side data line thereof connected to an individually associated processor side data line of said single root control node means; and designating means connected to said control input of each bi-mode control node means for designating an operating mode means of each bi-mode control node in said plurality thereof.

2. The partitionable parallel processor control network according to claim 1 wherein each bi-mode control node means in said plurality thereof includes:

means for introducing a relatively slight delay after receiving a ready signal on each processor side data line in said plurality thereof before outputting said initiate signal thereon when operating in said root operating mode.

3. The partitionable parallel processor control network according to claim 1 or claim 2 wherein said control node tree is configured in substantially a geometric progression of said bi-mode control node means proceeding from said single root node means to said plurality of parallel processors.

4. The partitionable parallel processor according to claim 1 or claim 2 wherein each bi-mode control node means in said plurality thereof includes a flip-flop settable by said control input to either of two states corresponding to said designated non-root operating mode and to said designated root operating mode.

* * * * *